Jan. 24, 1950 E. M. HANSEN ET AL 2,495,632

RADIO AND RECORD PLAYER CHASSIS SUPPORT

Filed April 19, 1947

2 Sheets-Sheet 1

INVENTORS.
EINAR M. HANSEN
JOHN E. HANSEN
BY Ralph T. French
ATTORNEY.

Jan. 24, 1950 — E. M. HANSEN ET AL — 2,495,632

RADIO AND RECORD PLAYER CHASSIS SUPPORT

Filed April 19, 1947

2 Sheets-Sheet 2

INVENTOR.
EINAR M. HANSEN
JOHN E. HANSEN

BY Ralph T. French

ATTORNEY.

Patented Jan. 24, 1950

2,495,632

UNITED STATES PATENT OFFICE 2,495,632

RADIO AND RECORD PLAYER CHASSIS SUPPORT

Einar M. Hansen and John E. Hansen, Jersey City, N. J.

Application April 19, 1947, Serial No. 742,508

1 Claim. (Cl. 29—288)

This application is a continuation-in-part of our copending application Serial Number 726,852 for Radio chassis support, filed February 6, 1947, and now abandoned.

This invention relates to radio and record players, more particularly to means for supporting radio and record player chassis while they are removed from their cabinets, and has for an object to provide improved supporting means of this character.

Most radio repair jobs require removal of the radio chassis from its cabinet, since many of the numerous parts of the radio are closely assembled on the chassis and cannot be reached or even observed when the chassis is assembled in the cabinet. Once the chassis has been removed from the cabinet it is desirable to support it in spaced relation to the table or work bench so that the repair man can get at the under side of the chassis as well as the upper side thereof. Frequently it is necessary to work at both sides at once, as when fastening or unfastening threaded connections such as nuts and bolts.

The same is true to an even greater degree with record player chassis, where the turntable, manual controls, tone arm, record feeding mechanism, etc., are above the platform, while the motor, gearing, linkage, control mechanism, etc., are below the platform. In repairing and testing record players it is essential, not only that the entire device be supported free and clear of the supporting surface, but also that the platform and its associated mechanism be supported substantially level, at least when being operated for observation or for test purposes.

Therefore, another object of the invention is to support a radio or record player chassis in spaced relation to a work bench or the like so that the chassis is accessible from both above and below.

Yet another object of the invention is to support a record player chassis and associated mechanism in a horizontal or normal playing position while removed from its cabinet.

Radio chassis usually comprise a base of sheet metal having integral end and/or side flanges extending at right angles thereto. The supporting structure should positively grip the chassis, but the edge available to be gripped varies with different chassis, depending on the number and location of side or end flanges and the mounting of radio parts near the chassis edges.

Consequently, a further object of the invention is to positively grip various radio chassis, regardless of differences in their structure.

To this end there is provided by the invention a base, a post extending vertically from the base, and a clamping head secured to the top of the post. The head is slotted for reception of an edge of the chassis base or of a flange thereof, and the head may be secured on the post in a number of different positions, whereby the slot may be disposed in various planes to receive an edge of the chassis, regardless of the shape or flange disposition of the latter.

Likewise, record player chassis or platforms are manufactured with flanged edges of at least two different forms. The more common form involves a shallow rolled edge flange of approximately one-half inch depth, while another form has straight edge flanges of a depth considerably greater than one inch.

Therefore, yet another object of the invention is to provide a support for radio and record player chassis, which support has a gripping head that can be connected to the chassis in a variety of positions.

These and other objects are effected by the invention as will be apparent from the following description and claim, taken in accordance with the accompanying drawings forming a part of this application, in which:

Figures 1, 2, 3:
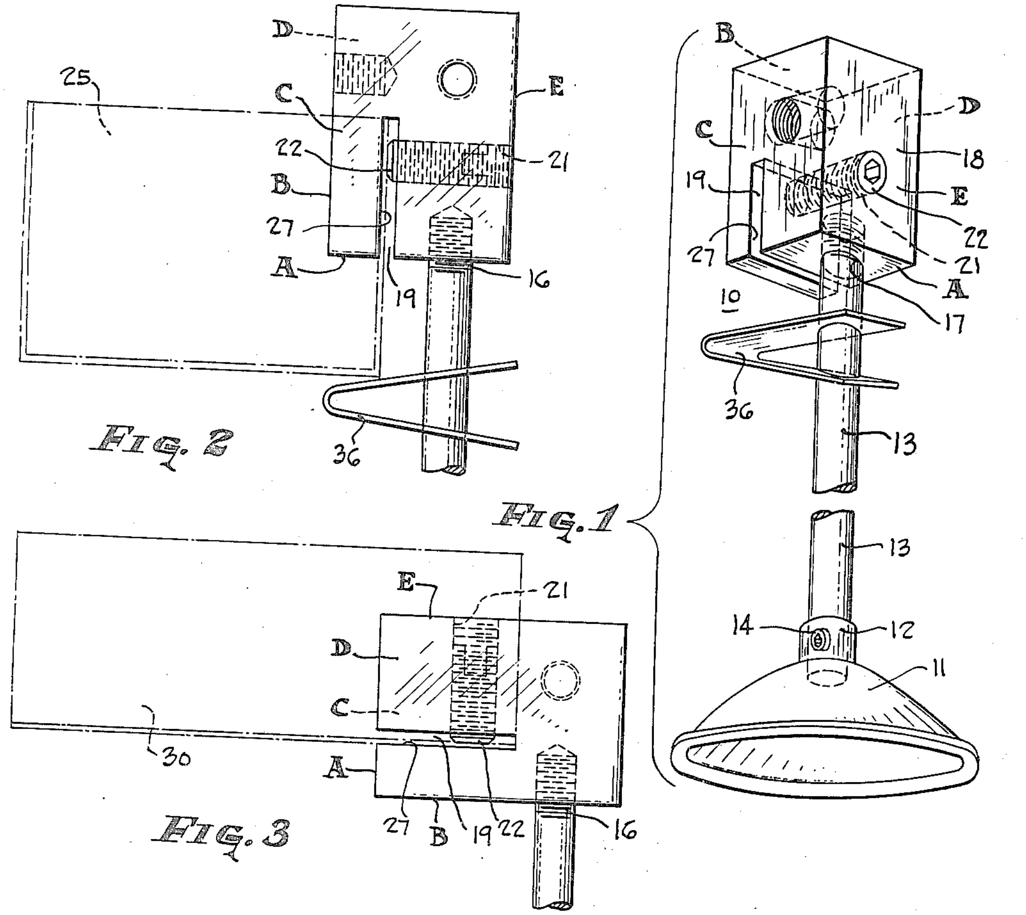
Fig. 1 is a perspective view of a support constructed in accordance with the present invention.
Fig. 2 is an enlarged elevational view of the clamping head disposed so as to grip a chassis which has both side and end flanges.
Fig. 3 is a view similar to Fig. 2, but showing the clamping head so disposed as to grip a chassis which has side flanges but no end flanges.

Referring now more in detail to Sheet 1 of the drawings, and particularly to Fig. 1 thereof, the reference character 10 indicates, in its entirety, a supporting structure comprising a base 11, having a collar 12 in which is received the lower terminal portion of a vertically-disposed post 13. A set screw 14, threaded through a wall of the collar 12, locks the post in any desired position of vertical adjustment relative to the base, for a purpose to be explained later.

The upper terminal portion of the post 13 is externally threaded, as at 16, for coaction with an internally-threaded opening 17 in the bottom face A (as viewed in Fig. 1) of a clamping head 18 which preferably is of cubical shape.

The clamping head 18 is provided with a slot 19 extending the full width of the face A and in a plane parallel to the face B inasmuch as the slot 19 extends the full width of the block, it also extends partway through the opposite faces C and D.

The face E is provided with an externally-threaded bore 21 containing a set screw 22, with the point 23 of the latter projecting into the slot 19 (Figs. 2 and 3). A flange or other portion of a chassis 25, inserted in the slot, may thus be clamped or gripped between the set screw point 23 and the opposed side wall 27 of the slot.

As previously mentioned, the shape or the flange arrangement of different chassis will vary, some having no flanges, others having side or end flanges only, and yet other having both side and end flanges. Thus, it will be apparent that not all chassis are adapted to be gripped by a clamping head whose slot lies in a vertical plane and opens downwardly, as in the arrangement of Figs. 1 and 2. This situation may be further complicated by various radio parts being positioned on, or in close proximity to, the flanges, with the result that it is highly desirable that the clamping head 18 be securable on the post 13 in a plurality of positions so as to dispose the slot 19 in a number of different planes.

Figure 4:
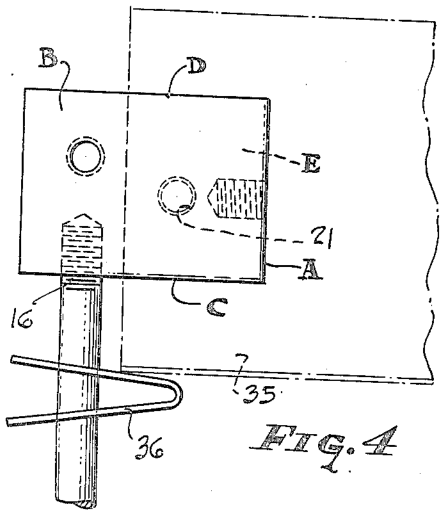
Fig. 4 is a view similar to Figs. 2 and 3, but showing the clamping head positioned to grip a chassis having end flanges but no side flanges.

To this end the clamping head has an internally-threaded post-receiving opening 28 in the face B (Fig. 3), and a similar opening 29 in the face C (Fig. 4), these openings 28 and 29 corresponding in structure and function to the opening 17 in the face A (Fig. 1). The three openings 17, 28 and 29 permit positioning of the head 18 on the post 13 in any one of three positions, as indicated in Figs. 2, 3 and 4, respectively. In Fig. 2 the slot lies in a vertical plane and opens downwardly to receive the upper edge of an end flange on the chassis 25. In Fig. 3 the slot is disposed in a horizontal plane and opens sideward for reception of the horizontal base of the cassis 30, while in Fig. 4 the slot lies in a vertical plane but opens sideward for reception of the edge of a side flange on the chassis 35.

Figure 5:
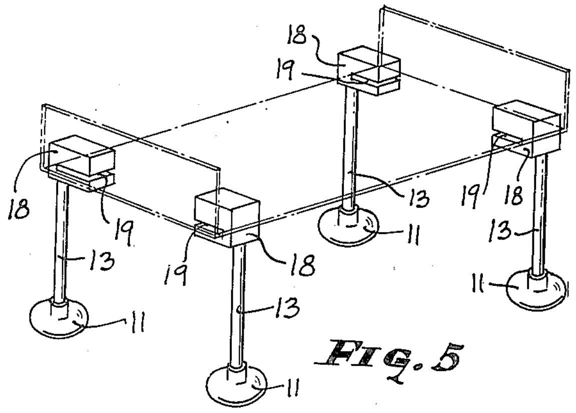
Fig. 5 is a schematic illustration of a chassis supported at its four corners by four supports of the type shown in Fig. 3.

While by using a support 10 of the type herein disclosed, and equipped with a relatively large base 11, a single such structure may serve to support a chassis, it is preferred to use a plurality of such supports, positioned one at each corner of the chassis, as illustrated in Fig. 5. Where more than three such supports are utilized, adjustment of the effective height of one or more of the supports may be necessary to assure positive supporting action by all, and such adjustment may be effected by loosening the set screw 14 in the collar 12 and sliding the post 13 vertically relative to the collar and base, after which the set screw is tightened.

If desired, the posts may be equipped with temporary rests 36 for supporting the chassis until the set screw 22 of each clamping head has been tightened to grip the chassis in the slot.

On Sheet 2 of the drawings there is illustrated a modified form of clamping head which differs from the previously-described construction of Figs. 1 to 5, inclusive, primarily in that the slot is much wider, one of the two legs of the U formed by the slot is materially longer than the other leg, and the head is provided with additional threaded openings for increasing its range of use. The wider slot permits of reception of shallow rolled edges of record player chassis in addition to the various forms of radio chassis previously mentioned. The additional threaded openings permit supporting of all forms of both radio and record player chassis known to applicants.

The clamping head 50, all of whose adjacent sides preferably lie in planes disposed at right angles to each other, is provided with a relatively wide slot 51 extending entirely through the head in one direction between the opposite faces J and K, the width of the slot being sufficient to freely receive the shallow (usually about one-half inch) rolled edge provided on most record player chassis.

Because of the slot 51 the clamping head is shaped generally as a U, having a long leg 52 and a short leg 53. The long leg 52 has a pair of threaded openings 54 and 55 therein, the opening 54 extending entirely therethrough from face L to face M and containing a set screw 56 whose point extends into the slot 51 and clamps against the inner surface of the short leg 53 any chassis flange or edge inserted therebetween in the slot.

Figure 15:
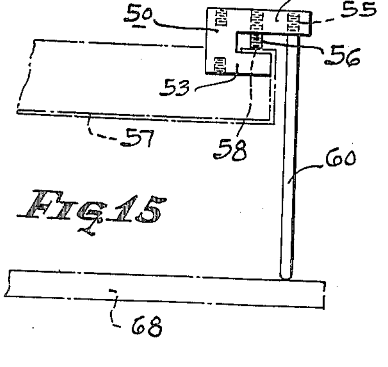

The threaded opening 55 is provided in that portion of the face M of the long leg 52 which projects beyond the short leg 53, as best illustrated in Fig. 15, where it will be seen that a post 60 has its upper end threadedly received in the opening 55 when the clamping head is used to support a box-type radio chassis 57 having an inturned flange 58.

Figure 12:
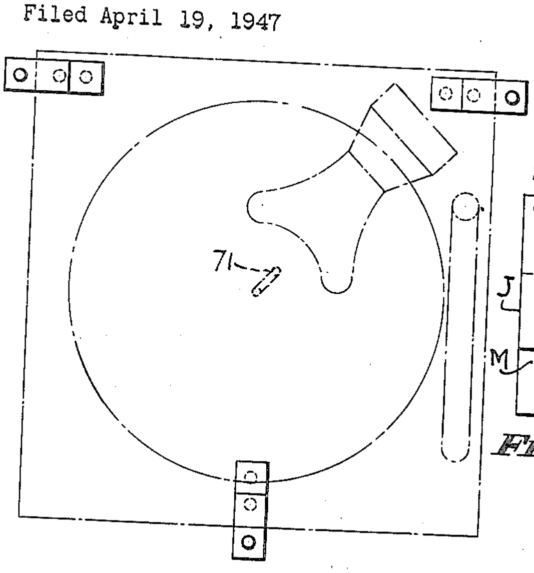
Fig. 12 is a plan view of the structure of Fig. 11.
Figures 6, 7, 8, 9, 10:
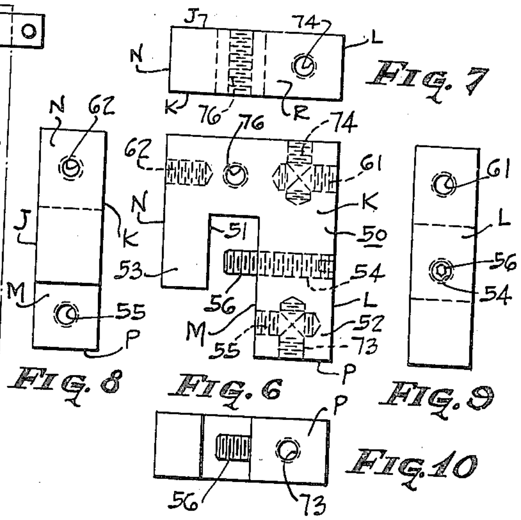
Fig. 6 is an elevational view of a modified clamping head, likewise constructed in accordance with the present invention.
Figs. 7, 8, 9 and 10 are top, left-hand, right-hand, and bottom elevational views, respectively, of the structure as shown in Fig. 6.
Figure 11:
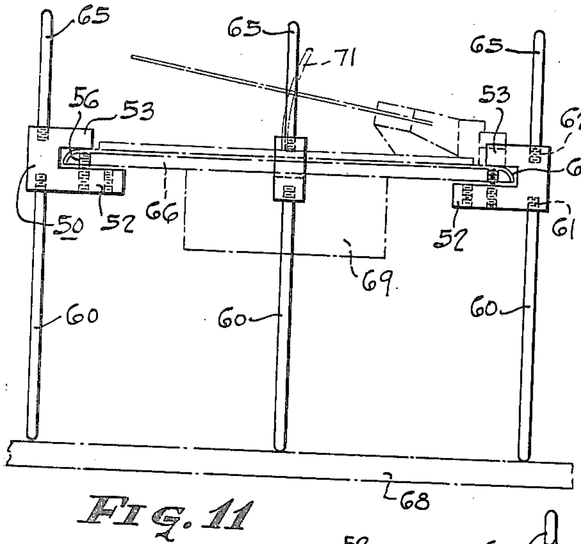
Fig. 11 is a side elevational view showing a common type of record player chassis supported in record-playing position by a plurality of supports of the type shown in Fig. 6.

The clamping head 50 also has opposed openings 61 and 62 in the faces L and N, respectively, the former being adapted for reception of a relatively long leg or post 60 and the latter for a shorter post 65 (Fig. 11). When a record player chassis 66 having a relatively shallow rolled edge 67 is to be supported, a plurality of clamping heads 50 are arranged as shown in Figs. 11 and 12, with the long posts 60 supporting the chassis a sufficient distance above the work bench or other surface 68 to afford ample room for the record player motor 69 and associated parts.

Figure 13:
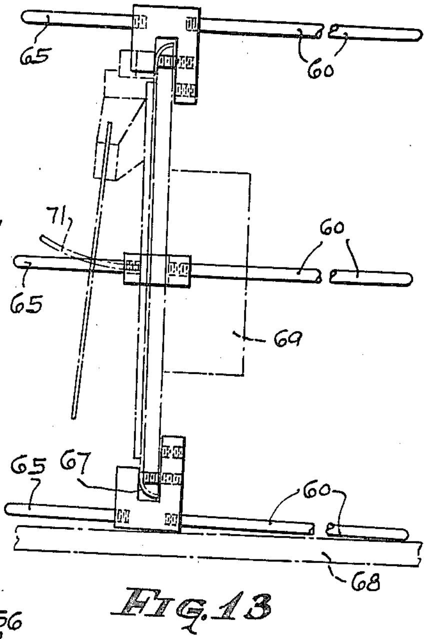
Fig. 13 is a side elevational view of the structure shown in Figs. 11 and 12, but with the structure turned 90 degrees to render both sides of the chassis accessible for repair.

The short posts 65 in the threaded holes 62 are of greater length than the record playing and supporting mechanism at the upper side of the chassis, including the spindle 71, so that the entire assembly, as shown in Fig. 11, may be supported bottom side up to render the motor more readily accessible for repair or adjustment without the necessity of changing the relation of the chassis and clamping heads. If desired, the entire assembly may also be turned on its side, as illustrated in Fig. 13, so that the mechanism both above and below the chassis or table may be freely accessible simultaneously.

Figure 14:
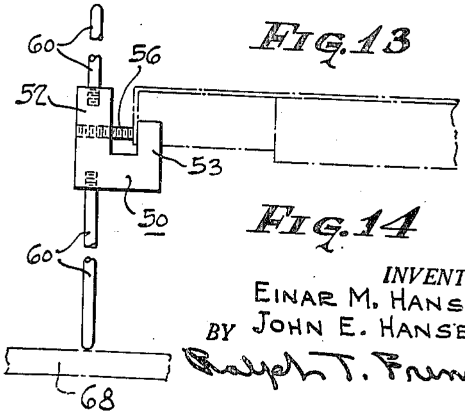
Fig. 14 is a fragmentary view similar to Fig. 11, but showing the clamping head positioned to support a deep-flanged type of record player chassis; and, Fig. 15 is a fragmentary view similar to Fig. 14, but with the clamping head in yet another position to support a box-type chassis having inturned flanges.

The end face P of the long leg 52 is provided with a threaded opening 73 corresponding to the opening 17 in the earlier-described structure, and the opposite face R has a threaded opening 74, these openings being adapted to receive long and short posts 60 and 65, respectively, when the clamping heads are used to support deep-flanged record player chassis, as illustrated in Fig. 14.

The clamping head 50 also has a threaded opening 76 in the face K, corresponding to the opening 29 in the first-described structure, and it will be apparent that the clamping head 50 can perform all of the functions of the clamping head 18 of Fig. 2, in addition to its special functions hereinbefore described in connection with the two types of record player chassis and the box-type radio chassis. In other words, the structure of clamping head shown on Sheet 2 of the drawings is capable of supporting all of the various chassis mentioned in this application, both radio and record player, while the clamping head shown on sheet 1 of the drawings is intended primarily for radio chass, altho it will be apparent that it may be useful for supporting other structures.

The uses of the various threaded openings for reception of short and/or long posts may be tabulated as follows:

| Opening No. | Chassis Type |
|---|---|
| 61 and 62 | Record player with shallow rolled flange. |
| 73 and 74 | Record player with deep straight flange. |
| 65 | Radio—box type. |
| 73 | Radio—side and end flanges. |
| 76 | Radio—end flanges only. |
| 62 | Radio—side flanges only. |

While the invention has been shown in but two forms, it will be apparent that it is not so limited, but is susceptible of various changes and modifications, without departing from the spirit thereof.

What is claimed is:

In apparatus for temporarily supporting a radio or record player chassis externally of its cabinet, a clamping block having a chassis-receiving slot extending entirely across a first side thereof from an adjacent second side to an adjacent third side opposite said second side with said slot separating a pair of legs, one of said legs having a threaded opening therethrough from a fourth side of the clamping block to the corresponding side of the slot, said fourth side joining said second and third sides, a clamping member threaded in said opening with one end extending into the slot and adapted to clamp against the opposite side of the slot a chassis edge disposed in said slot, said block having a fifth side opposite said fourth side and joining said second and third sides, and a sixth side joining said second, third, fourth and fifth sides, said first, second and fifth sides each having a cylindrical post-receiving opening therein, whereby said block may be secured to a vertical cylindrical supporting post in any of three different positions, one leg of said pair of legs being materially longer than the other leg of said pair, said longer leg carrying the clamping member and having a second opening therein in the inner face thereof in that portion of said leg which extends beyond the shorter leg.

EINAR M. HANSEN.
JOHN E. HANSEN.

REFERENCES CITED

The following references are of record in the file of this patent:

UNITED STATES PATENTS

| Number | Name | Date |
|---|---|---|
| 335,503 | Butler | Feb. 2, 1886 |
| 454,553 | Whitten | June 23, 1891 |
| 935,730 | Bacon | Oct. 5, 1909 |
| 1,126,053 | McGough | Jan. 28, 1915 |
| 1,245,744 | Leibner | Nov. 6, 1917 |
| 1,717,106 | Holt | June 11, 1929 |
| 2,017,245 | Hertzberg | Oct. 15, 1935 |
| 2,211,287 | Neubig et al. | Aug. 13, 1940 |

FOREIGN PATENTS

| Number | Country | Date |
|---|---|---|
| 465,847 | Germany | Sept. 28, 1928 |